(12) United States Patent
Horley et al.

(10) Patent No.: US 8,707,106 B2
(45) Date of Patent: Apr. 22, 2014

(54) KEY ALLOCATION WHEN TRACING DATA PROCESSING SYSTEMS

(75) Inventors: John M Horley, Cambridge (GB); Andrew B Swaine, Cambridge (GB); Paul A Gilkerson, Cambridge (GB)

(73) Assignee: ARM Limited, Cambridge (GB)

( * ) Notice: Subject to any disclaimer, the term of this patent is extended or adjusted under 35 U.S.C. 154(b) by 333 days.

(21) Appl. No.: 13/067,576

(22) Filed: Jun. 9, 2011

(65) Prior Publication Data

US 2011/0314264 A1 Dec. 22, 2011

(30) Foreign Application Priority Data

Jun. 21, 2010 (GB) .................................. 1010350.5

(51) Int. Cl.
*G06F 11/00* (2006.01)

(52) U.S. Cl.
USPC .......................................................... 714/45

(58) Field of Classification Search
USPC .......................................................... 714/45
See application file for complete search history.

(56) References Cited

U.S. PATENT DOCUMENTS

| | | | |
|---|---|---|---|
| 4,905,204 A * | 2/1990 | Hughes .......................... | 367/62 |
| 5,724,566 A | 3/1998 | Swoboda et al. | |
| 6,681,321 B1 | 1/2004 | Dale et al. | |
| 6,715,140 B1 * | 3/2004 | Haga ............................ | 717/130 |
| 7,168,066 B1 | 1/2007 | Thekkath et al. | |
| 7,194,731 B1 | 3/2007 | Cantrill | |
| 7,225,434 B2 * | 5/2007 | Calyanakoti et al. ......... | 717/130 |
| 7,707,394 B2 | 4/2010 | Ashfield et al. | |
| 7,987,393 B2 * | 7/2011 | Sohm et al. .................... | 714/45 |
| 2002/0147965 A1 | 10/2002 | Swaine et al. | |
| 2005/0125613 A1 | 6/2005 | Kim et al. | |
| 2006/0259822 A1 * | 11/2006 | Swoboda ....................... | 714/38 |
| 2006/0259827 A1 | 11/2006 | Sohm et al. | |
| 2006/0267818 A1 | 11/2006 | Agarwala | |
| 2008/0172548 A1 | 7/2008 | Caprioli et al. | |

FOREIGN PATENT DOCUMENTS

| | | |
|---|---|---|
| JP | 6-282468 | 10/1994 |
| WO | WO 2008/128476 | 10/2008 |

OTHER PUBLICATIONS

International Preliminary Report on Patentability mailed Sep. 12, 2012 in PCT/GB2011/050979.
International Search Report and Written Opinion of the International Searching Authority mailed Dec. 14, 2011 in PCT/GB2011/050979.
UK Search Report mailed Oct. 4, 2010 in GB 1010350.5.
IEEE-ISTO, "The Nexus 5001 Forum™—Standard for a Global Embedded Processor Debug Interface" Version 2.0, IEEE-ISTO 5001, Dec. 2003, pp. 1-157.
MIPS Technologies, "MIPS® PDtrace™ Specification" Document No. MD00439, Revision 6.13, Jul. 2009, pp. 1-145.
ARM Limited, "Embedded Trace Macrocell™ ETMv1.0 to ETMv3.4 Architecture Specification" 1999-2002, 2004-2007, 476 pages.

\* cited by examiner

*Primary Examiner* — Charles Ehne
(74) *Attorney, Agent, or Firm* — Nixon & Vanderhye P.C.

(57) ABSTRACT

A trace unit is provided which is configured to generate items of trace data indicative of processing activities, of a data processing unit. The trace unit comprises a trace indexing unit configured to associate an index value with at least a subset of the items of trace data generated by the trace unit. The trace indexing unit is configured to generate each index value as one of a predetermined sequence of index values, wherein an $n+1^{th}$ index value in the predetermined sequence can be determined from only an $n^{th}$ index value in the predetermined sequence.

48 Claims, 9 Drawing Sheets

| CORE KEY ↓ | | IN FLIGHT |
|---|---|---|
| α | D1 | 1 |
| β | D2 | |
| γ | D3 | |

FIG. 7

KEY ALLOCATION WHEN TRACING DATA PROCESSING SYSTEMS

This application claims priority to GB Application No. 1010350.5, filed 21 Jun. 2010, the entire contents of which is hereby incorporated by reference.

BACKGROUND OF THE INVENTION

1. Field of the Invention

The present invention is concerned with monitoring the activities of a data processing unit, in particular generating items of trace data indicative of those processing activities of the data processing unit.

2. Description of the Prior Art

The complexity of modern data processing apparatuses (such as microprocessors) means that programming and debugging the operation of such data processing apparatuses is a complicated and time-consuming task. As such, it is extremely useful to a programmer seeking to correctly configure a data processing apparatus to be able to monitor the operation of the data processing apparatus as it carries out its processing activities, in order to verify that those operations are being carried out as desired and to troubleshoot problems as they occur.

This desire to monitor the processing activities of a data processing apparatus must be balanced against the knowledge that contemporary data processing apparatuses are typically configured as very small scale devices, such as a System on Chip (SoC). It is well known that space constraints in such devices are an extremely important factor in their construction, and hence the opportunities for adding monitoring components to such devices are very limited. Similarly, the pins on the periphery of a SoC are also at a premium, constraining the amount of diagnostic data that may be exported from the SoC for external analysis.

For these reasons, it is known to provide a trace unit in association with such data processing apparatuses, the trace unit being configured to monitor the processing activities of the data processing apparatus and to generate a sequence of trace data items indicative of those processing activities. In particular, in order to reduce the bandwidth of data which must be transferred, it is known to provide the items of trace data in a highly compressed form, omitting any information that is redundant and only including data which is strictly necessary for the current analysis purpose. U.S. Pat. No. 7,707,394 sets out some techniques for reducing the size of a data stream produced during instruction tracing.

The difficulties associated with tracing the activity of a data processing apparatus are accentuated if the data processing apparatus is capable of speculative instruction execution. It is known to provide speculative instruction execution because of the opportunities this technique provides for faster operation, for example by avoiding pipeline stages being idle. However, speculative instruction execution presents a trace unit with a difficulty, since until the speculation is resolved (i.e. it is known whether a given instruction was actually committed), the trace unit is unable to provide a stream of trace data which definitively indicates the operation of the data processing apparatus. One possibility is for the trace unit to buffer the trace data it generates until speculation is resolved, but the buffer space that this technique requires can become undesirably large if the speculation depth of the processor is significant. An alternative technique is also to generate the trace data speculatively, and then to cancel certain items of trace data if it is subsequently found that the instructions to which they correspond were mis-speculated. For example, the Nexus protocol ("The Nexus 5001 Forum—Standard for a Global Embedded Processor Debug Interface", IEEE-ISTO 5001-2003, 23 Dec. 2003) supports the cancelling of a specified number of trace data items.

However, even if the data processing apparatus specifically indicates to the trace unit which instructions (or more typically groups of instructions) should be cancelled, identifying the items of trace data which correspond to those cancelled instructions is not straightforward. Groups of instructions are typical of speculative execution since only some instructions can result in a change in program flow, and hence groups of instructions can be identified wherein if the group is executed at all, then the whole group will be executed.

A particular issue arises with the tracing technique of only generating trace data for selected instructions, since this can make the generation of a corresponding cancelling item of trace data difficult, because if (for example) the data processing apparatus indicates that the most recent two groups of instructions should be cancelled, the trace unit cannot simply indicate to the downstream analysis unit that two items of trace data should be cancelled, since there is no such direct correlation between groups of instructions and the number of items of trace data generated.

Another problem associated with the difficulty in later identifying particular items of trace data arises in the context of data transfers. Since a load or store operation can take many cycles to complete, when (for example) a load instruction is executed and a corresponding item of trace data is generated, by the time the requested data value has been retrieved from memory it is difficult to identify that corresponding item of trace data, generated many cycles earlier, with which the data value should be associated. If the processor can execute instructions or perform data transfers out of program order, then there may be no way for the trace unit to identify which data values belong to which data addresses.

Some background technological information about tracing out-of-order processors can be found in "The PD Trace Interface and Trace Control Block Specification", 4 Jul. 2005 (available from http://www.mips.com/products/product-materials/processor/mips-architecture/) and in the ARM ETMv3 architecture (available from http://infocenter.arm.com).

Consequently it would be desirable to provide an improved technique for generating items of trace data, which would allow a trace unit to address the above described problems.

SUMMARY OF THE INVENTION

Viewed from a first aspect, the present invention provides a trace unit configured to generate items of trace data indicative of processing activities of a data processing unit, said trace unit comprising: a trace indexing unit configured to associate an index value with at least a subset of the items of trace data generated by the trace unit, said trace indexing unit configured to generate said index value as one of a predetermined sequence of index values, wherein an $n+1^{th}$ index value in said predetermined sequence can be determined from only an $n^{th}$ index value in said predetermined sequence.

According to the techniques of the present invention, the trace unit comprises a trace index unit which is configured to associate an index value with at least a subset of the items of trace data generated by the trace unit. In particular, the index values are generated by the trace indexing unit in accordance with a predetermined sequence of index values such that an $n+1^{th}$ index value in the predetermined sequence can be determined from only an $n^{th}$ index value in the predetermined sequence. In terms of the generation of items of trace data, the association of these index values with at least some of the items of trace data is advantageous, because it allows the trace unit to "tag" at least some of the items of trace data it generates, so that later reference to particular items of trace data is possible. This may be of particular benefit for example when seeking to later cancel particular items of trace data, due to mis-speculation. Alternatively it may be of benefit when seeking to associate data values with items of trace data generated for data transfer instructions which can take a long time to complete. By indexing items of trace data in this matter, later reference to particular items of trace data can be made. Also, by being able to determine an $n+1^{th}$ index value in the predetermined sequence from only an $n^{th}$ index value in the predetermined sequence, much of the indexing can be implied, and does not generally need to be explicitly traced. Valuable space within the trace unit can thus be saved, and considerable trace data bandwidth savings can be made.

Whilst a number of ways of providing the predetermined sequence of index values is possible, in one embodiment said trace unit comprises a counter, said counter configured to provide said predetermined sequence of index values. A counter may be relatively easily implemented in the hardware of the trace unit and the predetermined sequence of index values generated by a counter (typically an incremental sequence) is advantageously easily administered.

There are various ways in which the trace unit could make use of the index values which it associates with some items of trace data, but in embodiments said trace unit comprises an index storage unit configured to store at least one said index value. The provision of an index storage unit allows the trace unit to maintain a record of at least one index value, such that later operation of the trace unit may make reference to that stored value and hence the item of trace data associated therewith.

In some embodiments the trace unit comprises an index storage unit configured to store a difference between two index values. This provides an advantageously compact storage mechanism, by which, for example, a range of index values can be stored. This index storage unit can, in one embodiment, be a FIFO device. A FIFO device presents a simple structure in which a sequence of values can be stored.

The data processing unit which the trace unit is configured to monitor could take a number of forms, however in one embodiment said processing activities of said data processing unit comprise speculative instruction execution and said at least one index value is associated with at least one speculatively executed instruction. The speculative execution of instructions can present a trace unit with difficulties, since if a speculatively executed instruction is later indicated by the data processing unit to have been mis-speculated, then the trace unit may be required to signify this fact to the recipient of its trace data. By having an index storage unit in which it may store an index value associated with a speculatively executed instruction, the trace unit is provided with a mechanism by which it may maintain a reference to that speculative instruction even some time after it has generated the corresponding item of trace data.

In some embodiments said index storage unit is configured to store said at least one index value until said at least one speculatively executed instruction has been either committed or cancelled. Hence the index storage unit will then retain the index value corresponding to the speculatively executed instruction until that speculatively executed instruction's fate is known, i.e. whether that instruction was correctly speculatively executed (and is "committed") or was mis-speculated (and is "cancelled"). Having the corresponding index value stored in the index storage unit enables the trace unit to make later reference to that instruction and thus to any trace data generated in association therewith.

The speculative execution of instructions may comprise the speculative execution of individual instructions, but in some embodiments said speculatively executed instruction forms part of a group of instructions, wherein speculative execution of a first instruction of said group of instructions necessitates speculative execution of all instructions of said group of instructions.

Speculatively executing instructions in groups is practical, since only some instructions (e.g. branches) cause possible deviations from sequential instruction execution and other instructions (e.g. an ADD instruction) are certain to be executed if the instruction that precedes them was executed. For this reason, a data processing unit configured to perform speculative instruction execution will typically speculatively execute groups of instructions which are known to form such indivisible groups.

In some embodiments, said index storage unit comprises a first index storage unit configured to store a first index value associated with a first instruction in said group of instructions. In generating trace data corresponding to a speculatively executed group of instructions, it is advantageous to store a first index value associated with a first instruction in that group of instructions, since this defines the start of the group of instructions.

Whilst the first index storage unit could store only a single entry, in embodiments said first index storage unit comprises a first plurality of entries and is configured to store said first index value in dependence on an indicator indicative of said group of instructions. Consequently the first index storage unit can store a first index value in an entry corresponding to an indicator indicative of the group of instructions, such that later reference to that group of instructions may allow the corresponding first index value to be retrieved from the first index storage unit.

Given that the data processing unit could speculatively execute a number of groups of instructions, it is advantageous if the trace unit is able to keep track of index values corresponding to each of those groups, and hence in one embodiment a number of said first plurality of entries corresponds to at least a maximum number of groups of instructions which may be speculatively executed by said data processing unit.

Speculative instruction execution is of course sometimes incorrect and in some embodiments said trace unit is configured to receive a cancelling indication from said data processing unit, said cancelling indication indicative that a selected group of instructions which has been speculatively executed has been cancelled, and said trace unit is configured to generate a cancelling item of trace data indicative of said selected group of instructions. Hence, when the data processing unit indicates that a selected group of instructions should be cancelled, the trace unit is configured to convey this information to the recipient of its trace data by generating a corresponding cancelling item of trace data.

In particular, in one embodiment said trace unit is configured, on receipt of said cancelling indication, to generate said cancelling item of trace data in dependence on a first index value stored in said first index storage unit and associated with said selected group of instructions. The first index value stored in the first index storage unit is associated with the first instruction in the group of instructions, and hence reference to this first index value enables the trace unit to provide an indication of the first item of trace data which should be cancelled due to the cancelling of that selected group of instructions. This first item of trace data could be the first of several items to be cancelled, or could be one specific item of trace data to be cancelled.

In some embodiments, the trace unit comprises a counter configured to provide said predetermined sequence of index values and said trace unit is configured to generate said cancelling item of trace data in further dependence on a current counter value of said counter. Since the trace unit is configured to use the counter to generate the sequence of index values, reference to a current counter value of the counter provides a reference to a most recent item of trace data. Hence by generating the cancelling item of trace data in dependence on both the first index value and the current counter value, the trace unit is able to indicate to the recipient of its trace data where in the sequence of trace data items the cancelling should begin and where it should finish.

In some embodiments, said index storage unit comprises a last index storage unit configured to store a last index value associated with a last instruction in said group of instructions. In generating trace data corresponding to a speculatively executed group of instructions, it is advantageous to store a last index value associated with a last instruction in that group of instructions, since this defines the end of the group of instructions.

Whilst the last index storage unit could store only a single entry, in embodiments said last index storage unit comprises a second plurality of entries and is configured to store said last index value in dependence on an indicator indicative of said group of instructions. Consequently the last index storage unit can store a last index value in an entry corresponding to an indicator indicative of the group of instructions, such that later reference to that group of instructions may allow the corresponding last index value to be retrieved from the second index storage unit.

Given that the data processing unit could speculatively execute a number of groups of instructions, it is advantageous if the trace unit is able to keep track of index values corresponding to each of those groups, and hence in one embodiment a number of said second plurality of entries corresponds to at least a maximum number of groups of instructions which may be speculatively executed by said data processing unit.

Speculative instruction execution is implemented since there are many situations in which the program flow can be accurately (statistically speaking) predicted. Once it is definitively known that speculative execution of an instruction is correct, that instruction is "committed" and in some embodiments said trace unit is configured to receive a committing indication from said data processing unit, said committing indication indicative that a selected group of instructions which has been speculatively executed has been committed, and said trace unit is configured to generate a committing item of trace data indicative of said selected group of instructions. Hence, when the data processing unit indicates that a selected group of instructions is committed, the trace unit is configured to convey this information to the recipient of its trace data by generating a corresponding committing item of trace data.

In particular, in one embodiment said trace unit is configured, on receipt of said committing indication, to generate said committing item of trace data in dependence on a last index value stored in said last index storage unit and associated with said selected group of instructions. The last index value stored in the last index storage unit is associated with the last instruction in the group of instructions, and hence reference to this last index value enables the trace unit to provide an indication of the last item of trace data which is definitely correct due to the committing of that selected group of instructions. This last item of trace data could provide the end point of a number of items to commit, or could be a specific item to commit.

In some embodiments, the trace unit comprises a counter configured to provide said predetermined sequence of index values and an uncommitted storage unit, said trace unit configured, when generating said committing item of trace, to store a current counter value of said counter in said uncommitted storage unit. Hence, at the moment when a group of instructions are committed, the trace unit can make a record of the current counter value indicating the point at which uncommitted instructions begin.

In some embodiments, the trace unit is configured to generate said committing item of trace in dependence on a value stored in said uncommitted storage unit. Since the uncommitted storage unit stores a current counter value from the moment when a committing item of trace is last generated, by generating the committing item of trace data in dependence on both the value stored in the uncommitted storage unit, the trace unit is able to indicate to the recipient of its trace data where in the sequence of trace data items the committing should begin and where it should finish.

In some embodiments, said index storage unit comprises a first index storage unit configured to store a first index value associated with a first instruction in said group of instructions, said index storage unit comprises a last index storage unit configured to store a last index value associated with a last instruction in said group of instructions, and said last index value is stored in a format relative to said first index value.

Constraints on the number of instructions in a group of instructions, which in turn impose constraints on the number of instructions between a first instruction and a last instruction in that group of instructions, may mean that advantageous storage efficiency may be gained by storing the last indexed value in a format relative to the first index value, for example as an offset thereon. It will be appreciated that this relative format could take a number of forms, but in one embodiment said format relative to said first index value is a 2-bit data format. Alternative embodiments could use a 1-bit data format or more than 2 bits in the data format, depending on the number of instructions in a group which are interesting.

In some embodiments the trace unit comprises a speculation depth counter, said speculation depth counter configured to indicate a current speculation depth of instructions being executed by said data processing unit. The provision of a speculation depth counter enables the trace unit to keep track of the number of instructions which have been speculatively executed, and therefore may need to be cancelled or committed. This speculation depth counter can thus be decremented when speculatively executed instructions are either committed or cancelled.

In some embodiments, the trace unit comprises a pending commit counter, said pending commit counter configured to indicate a current number of committing items of trace data which are pending output. Accordingly the trace unit does not need to immediately output a committing item of trace data when it occurs, but can keep track of a number of such pending items. This further benefits the desirable reduction in trace bandwidth.

In some embodiments the trace unit is configured to increment said pending commit counter when said committing indication is received without said committing item of trace data being generated. Hence the pending commit counter reduces the frequency with which trace data must be generated, since a running total of the number of pending commits can be maintained, incrementing the pending commit counter when a committing indication is received from the data processing unit but without generating a committing item of trace data.

In some embodiments, the trace unit is configured to decrement said pending commit counter when said speculation depth counter reaches a predetermined value. For example, when the speculation depth counter reaches a known maximum speculation depth of the data processing unit, it can be inferred that a commit must take place of the oldest speculatively executed instruction.

In some embodiments, when said speculation depth counter reaches a predetermined value generation of a further item of trace data implies that said trace unit has received a further committing indication from said data processing unit. For example, when the speculation depth counter reaches a known maximum speculation depth of the data processing unit, the commit of the oldest speculatively executed instruction can be inferred by the recipient of the trace data if a further item of trace data is received. The recipient of the trace data will typically be arranged to also track the speculation depth of the data processing unit to enable this inference.

In some embodiments, the trace unit is configured, in response to a predetermined event, to reset said index value of said predetermined sequence of values to a predetermined value. For example, it may be desirable to associate further items of trace data with the same index value, and this can be simply achieved by resetting the index sequence.

In some embodiments, the trace unit is configured to generate said predetermined sequence of values as a looping sequence of values. This provides a convenient mechanism for generating an endless sequence.

The trace unit may be configured in a number of ways, but in one embodiment said trace unit is configured not to generate an item of trace data for at least one type of instruction to which said data processing unit is responsive. Particular instructions may be of more interest than others to the recipient of the generated trace data and hence valuable trace bandwidth may be saved by omitting certain types of instruction from the trace data which are not of interest.

In some embodiments said index storage unit is configured selectively to store an in-flight indicator, said in-flight indicator indicating that a stored index value of said predetermined sequence of index values is currently in use. Whilst the predetermined sequence of index values may be chosen so that reuse of index values may occur without ambiguity, there may be instances where certain index values remain associated with particular trace items for longer. An in-flight indicator provides a mechanism to identify which index values should be handled in this manner.

In some embodiments said trace unit is configured, when generating a next index value, to reference said in-flight indicator and, if said in-flight indicator indicates that said next index value is still in use, to store a substitute index value in place of said next index value. Storing a substitute index value avoids reusing the index value which is still in use.

The processing activities of the data processing unit may vary, but in one embodiment said processing activities of said data processing unit comprise reference to a stored data value using a data address and said index value is a data address index value associated with said at least one data address. Reference to a stored data value using a data address may take a significant amount of time when compared to the timescale on which instructions are being traced by the trace unit. For example, when an instruction causes the data processing unit to load a data value from memory by reference to its data address, that data value may not be returned to the data processing unit until many clock cycles later. In this situation, an item of trace data generated by the trace unit in association with that loading instruction may have be been generated a long time before the data value is returned to the data processing unit. In such a scenario, the use of a data address index value is advantageous, because this provides a mechanism by which particular items of trace data associated with a data address which refers to a stored data value may later be identified, for example once that reference process has been completed.

In some embodiments said reference to said stored data value comprises loading said stored data value and in other embodiments said reference to said stored data value comprises storing said stored data value. Both loading and storing data values require access to memory which can take the long periods of time referred to above.

In some embodiments said trace unit is configured to store said data address index value in a data address index value storage table. The provision of a data address index value storage table enables the data trace unit to store a data address index value until reference thereto is later needed, for example when a load or store operation associated therewith completes.

As discussed above, there are certain instructions with which a generated item of trace data may be associated which can take a considerable amount of time for their operations to complete. Such instructions may thus be distinguished from other instructions which once traced have no further event which must occur before that instruction can be considered to be completed. The state of waiting for such an event to complete is known as being "in-flight" and in some embodiments, said trace unit is configured selectively to store an in-flight indicator, said in-flight indicator indicating that reference to said stored data value associated with said data address index value has not yet completed and said data address index value is in-flight. Configuring the trace unit to store an in-flight indicator in this manner provides a mechanism by which the trace unit can keep track of those data address index values which are associated with operations which are not yet complete.

In such embodiments the trace unit may be configured, when generating a next data address index value, to reference a stored in-flight indicator and, if said stored in-flight indicator indicates that said next data address index value is still in-flight, to store a substitute data address index value in place of said next data address index value.

The trace unit will, for reasons of space constraints, typically have a finite and limited range of data address index values that it can generate. Hence, when an instruction is encountered which takes a long time to complete, the use of a data address index value associated with that instruction may be required for a longer period than that in which the trace unit cycles through the full set of data address index values available to it. Hence, the trace unit may encounter a data address index value which is still in-flight, i.e. should not yet be reused, and in this situation the trace unit is configured not to simply use the next data address index value in the predetermined sequence, but to store a substitute data address index value in its place. In this way, a limited and finite set of data address index values may be generally used by the trace unit, but the occasional situation in which a data address index value is required to be used for a longer period than the natural cycle of those data address index values can still be accommodated.

The substitute data address index value could take a number of forms, but in one embodiment said substitute data address index value comprises data processing unit index value, wherein said data processing unit index value is used by said data processing unit to reference said data address.

The data processing unit itself will typically also have an indexing system which it uses to reference such data addresses, so that it can associate data values with data addresses even when there is (in processor cycle terms) a considerable delay between the reference to the data address being made and the data value being returned. In this situation, the corresponding data processing unit index value (sometimes referred to as a "core key") can be used by the trace unit as the substitute data address index value. However it need not be the "core key" itself which is used for the substitute data address index value (the "special key"), and in one embodiment said substitute data address index value has a one-to-one correspondence with a data processing unit index value, wherein said data processing unit index value is used by said data processing unit to reference said data address.

When the in-flight indicator is stored by the trace unit, in some embodiments the in-flight indicator is stored in association with said data address index value, whereas in other embodiments said in-flight indicator is stored in association with said data processing unit index value.

When the trace unit makes use of a substitute data address index value, in some embodiments said trace unit is configured to generate an item of trace data indicative of said substitute data address index value. Whilst the predetermined sequence of index values generated by the trace unit generally allows the index of a given item of trace data to be inferred from the index value of the previous item of trace data this is not the case when a substitute data address index value is used. It may then be advantageous for the trace unit to generate an item of trace data indicative of the substitute data address index value, such that the recipient of the trace data can determine this "one-off" special index value.

The substitute data address index value and the data address index value may be encoded according to different protocols, but in one embodiment said substitute data address index value and said next data address index value share an encoding protocol. For example, a predetermined range within the protocol could be reserved for the data address index values, whilst the remainder is reserved for the substitute data address index values.

In some embodiments, said trace unit is configured to receive a merging indication from said data processing unit related to an initial group of instructions and a subsequent group of instructions, wherein said data processing unit issues said merging indication if it is determined that said subsequent group of instructions will execute if said initial group of instructions is executed, and hence that said initial group of instructions and said subsequent group of instructions are a merged group of instructions, and wherein said trace unit is configured, in dependence on said merging indication, to amend at least one merged index value in said index storage unit associated with said merged group of instructions.

In a data processing unit which handles groups of instructions for speculative execution, the definition of what constitutes a group is typically determined by instructions such as a branch instruction for which it is not yet known which way that branch will resolve. However, it is possible for the direction that such a branch will take to be resolved in advance, for example if the value on which a "branch if equal" instruction depends is determined and it is known that this value will not change before that branch instruction is executed. If such an instruction defines the boundary between two groups of instructions, then in this situation, the two groups of instructions can be merged, since the execution of the first will necessarily be followed by the execution of the second. When the data processing unit issues such a merging indication the trace unit can then amend an index value stored in the index storage unit associated with the two groups of instructions which have now become one. For example, where a first and last index value were previously stored in the index storage unit in association with a first and second group of instructions, when those two groups of instructions are merged, the values in the index storage unit may be amended to indicate a single group of instructions with the first index value taken from the first group and the last index value taken from the second group.

In some embodiments, said trace unit is configured to generate a merge item of trace data, said merge item of trace date indicative that said initial group of instructions and said subsequent group of instructions have been merged. In this situation the trace unit may be configured to generate a merge item of trace data to indicate to the recipient of the trace data that the two groups of instructions have been merged and handled as a single group of instructions.

Viewed from a second aspect, the present invention provides a trace unit configured to generate items of trace data indicative of processing activities of a data processing unit, said trace unit comprising: a trace indexing means for associating an index value with at least a subset of the items of trace data generated by the trace unit, said trace indexing means configured to generate said index value as one of a predetermined sequence of index values, wherein an $n+1^{th}$ index value in said predetermined sequence can be determined from only an $n^{th}$ index value in said predetermined sequence.

Viewed from a third aspect, the present invention provides a method of generating items of trace data indicative of processing activities of a data processing unit, said method comprising the steps of: generating said items of trace data; associating an index value with at least a subset of the generated items of trace data; generating said index value as one of a predetermined sequence of index values, wherein an $n+1^{th}$ index value in said predetermined sequence can be determined from only an $n^{th}$ index value in said predetermined sequence.

BRIEF DESCRIPTION OF THE DRAWINGS

The above, and other objects, features and advantages of this invention will be apparent from the following detailed description of illustrative embodiments which is to be read in connection with the accompanying drawings.

FIG. 7 schematically illustrates an index storage unit according to one embodiment;

DESCRIPTION OF THE PREFERRED EMBODIMENTS

Figure 1:
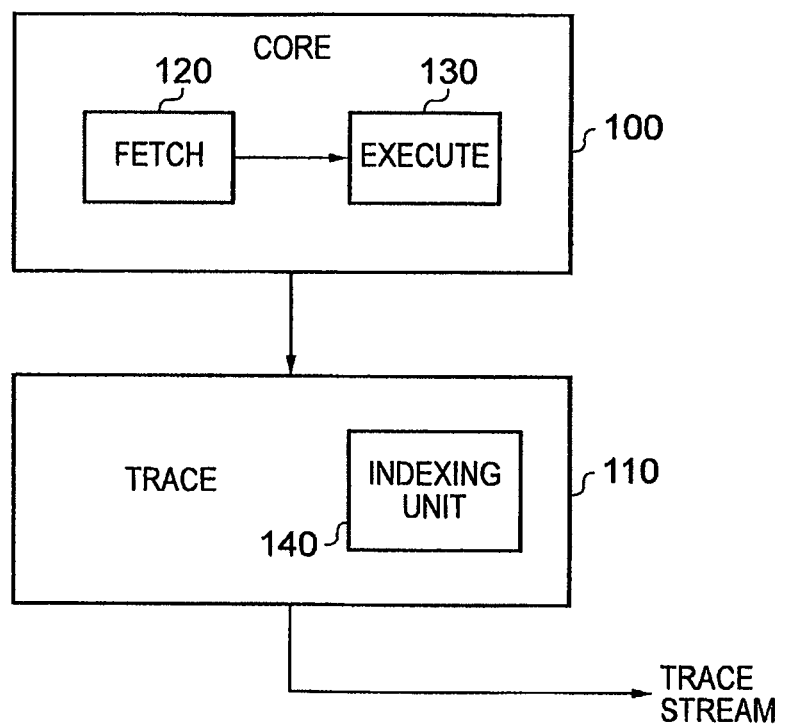
FIG. 1 schematically illustrates a data processing unit and an associated trace unit according to one embodiment.

FIG. 1 schematically illustrates a data processing system including a trace unit according to the present invention. The data processing system comprises processor core 100 (a data processing unit) and trace unit 110, configured to monitor the processing activities of processor core 100 and to generate items of trace data (as a trace stream) indicative of the processing activities of the core. The processor core 100 comprises a fetch unit 120 and an execute unit 130. The fetch unit 120 fetches instructions from memory (not illustrated) and passes them to execution unit 130 for execution. In particular, processor core 100 is a speculative and out-of-order processor, and hence fetch unit 120 is configured to fetch instructions for the execute unit 130 which are predicted (though not guaranteed) to be required. Execute unit 130 will speculatively execute these instructions, later cancelling or committing them when it is known whether that speculatively executed instruction should in fact be executed or not.

The trace unit 110 is configured to generate items of trace data indicative of the processing activities of processor core 100, including the speculative execution of instructions. Whilst it would in principle be possible for trace unit 110 to buffer items of trace data generated in association with speculatively executed instructions, and only to then release them as the output trace stream once the speculation is resolved, this requires valuable storage space within trace unit 110 which is preferably avoided. Instead in the embodiment illustrated in FIG. 1, trace unit 110 is configured to also speculatively generate trace data, i.e. to generate items of trace data indicative of speculatively executed instructions, and then to cancel/commit those items of trace data once it is known whether the speculation was correct or not. In order to do this trace unit 110 is further provided with a trace indexing unit 140. The indexing unit 140 is configured to associate an index value with at least a subset of the items of trace data generated by the trace unit 110. In particular, the indexing unit 140 is configured to generate the index values as a predetermined sequence of index values, wherein an $n+1^{th}$ index value can be determined from an $n^{th}$ index value in the predetermined sequence. In the embodiment illustrated, this functionality is provided by a counter in the indexing unit 140, as will be further described with reference to FIG. 2.

Figure 2:
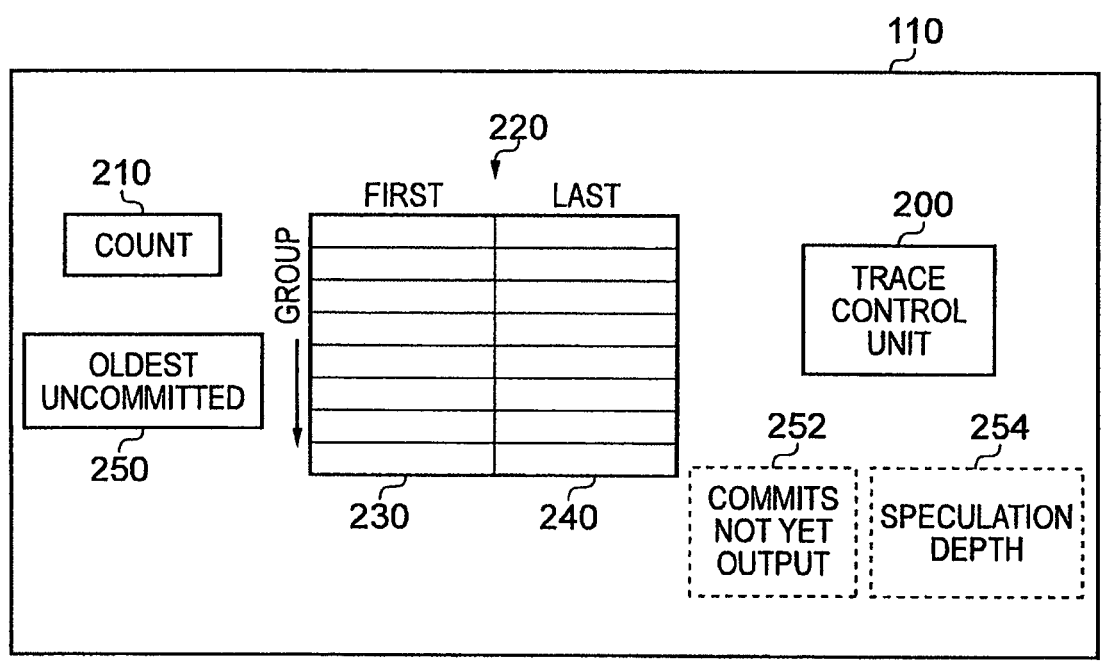
FIG. 2 schematically illustrates in more detail the trace unit of FIG. 1.

FIG. 2 schematically illustrates in more detail the trace unit 110 shown in FIG. 1. Trace unit 110 comprises trace control unit 200, which controls the overall operation of trace unit 110. Trace unit 110 further comprises counter 210, which provides the predetermined sequence of index values which the trace unit 110 can associate with (some of) the items of trace data it generates. The trace unit 110 also comprises an index storage unit 220 in which index values generated by counter 210 may be stored. The index storage unit 220 comprises a first index storage unit 230 and a last index storage unit 240. For the first instruction in a speculatively executed group of instructions, the trace unit 110 is configured to store the current counter value from counter 210 into the first index storage unit indexed by the group number. Conversely, when a new group is started, the current counter value is stored in the last index storage unit 240.

In the embodiment illustrated, the index storage unit 220 has sufficient entries to correspond to the maximum speculation depth of the processor, in terms of groups of instructions. The maximum speculation depth of the processor represents the maximum number of entries which the index storage unit may have to hold, since beyond that depth the processor must commit or cancel a group of instructions, which will free up an entry in the index storage unit. Also, in the embodiment illustrated, each group of instructions speculatively executed by the processor can have a maximum of one branch instruction and one load (or store) instruction. Since all other instructions can be inferred from a trace stream including indications of these instructions, a maximum of two instruction trace items will be generated per group of instructions. This has the further consequence that for a given entry in the index storage unit 220, the value in the last index storage unit 240 can be at most 2 counts different from the value in the first index storage unit 230. Valuable storage space is thus saved by storing the last index values as a 2-bit offset from the first index value (i.e. +0, +1 or +2). The trace unit further comprises an oldest uncommitted storage unit 250, the function of which will be explained hereafter. The variation of trace unit 110 comprising the dashed boxes 252 and 254 is also described later.

Figure 3:
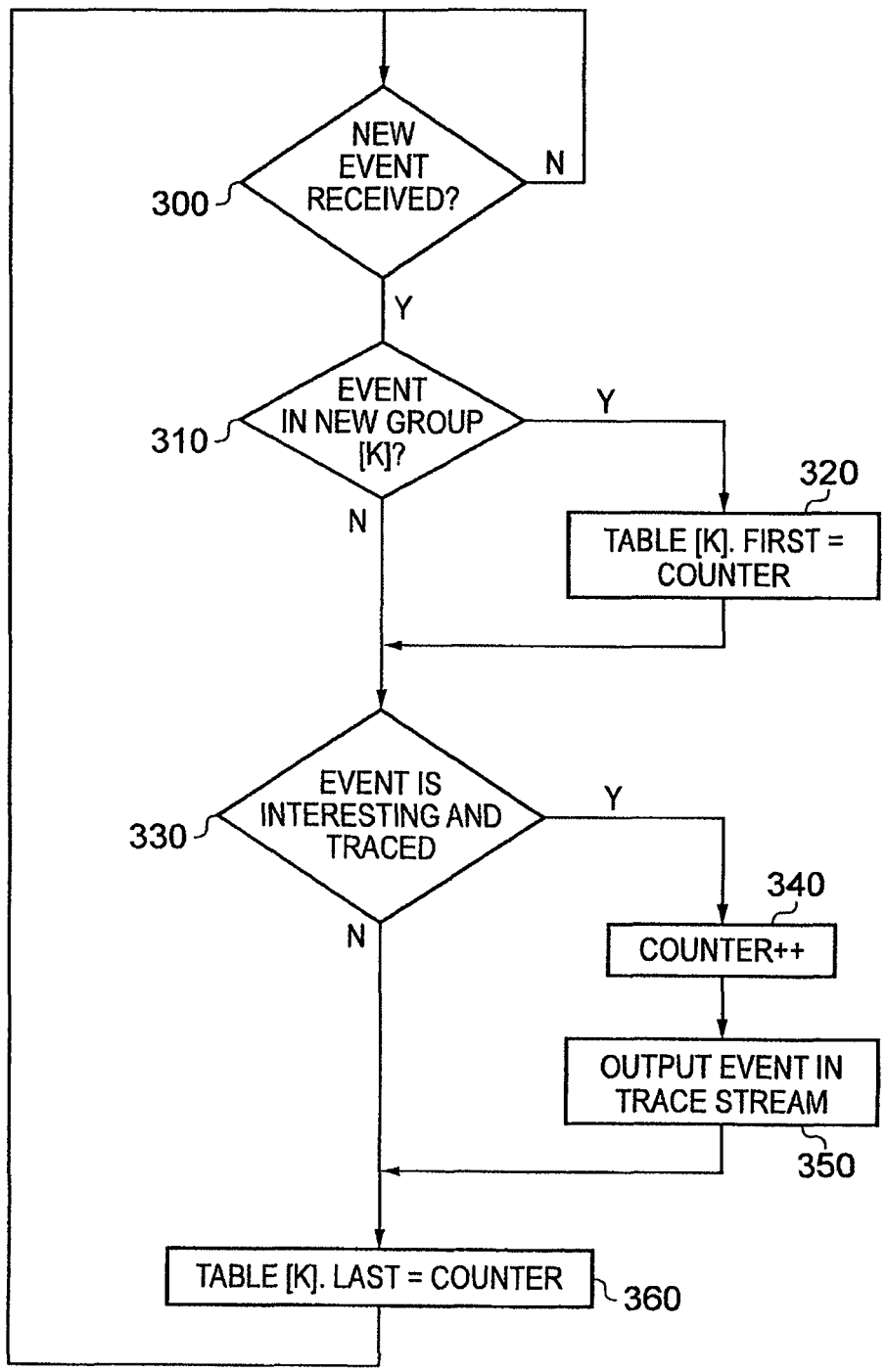
FIG. 3 illustrates a series of steps taken by a trace unit according to one embodiment.

A series of steps carried out by trace unit 110 is schematically illustrated in FIG. 3. The flow begins at step 300 where a new event from processor core 100 is waited for, the flow looping on itself at step 300 until an event is received. When a new event is received (i.e. a next instruction is executed by the core), the flow proceeds to step 310, where it is determined if the event is part of a new group of instructions. If it is, then the flow proceeds to step 320 in which an entry in the first index storage unit 230 of index storage unit 220 (the "table") is updated with the current counter value at the entry corresponding to the new group number K. Next, at step 330, it is determined if this event is both "interesting" and traced. "Interesting" instructions are branch, load and store instructions (since as discussed above, these are the key instructions in terms of tracing a group of instructions). An instruction is traced if it is not currently being filtered out by the trace unit. If the event (i.e. instruction) is both interesting and traced then the flow proceeds to step 340 where the counter 210 is incremented and at step 350 the event is output in the trace stream of the trace unit 110. At step 360 the entry of the last index storage unit 240 corresponding to group K is updated with the current value of the counter 210. The flow then returns to step 300.

The operation of trace unit 110, and in particular the operation of the index storage unit (also known as the "tracking table") 220, is now described with reference to Table 1 below. Table 1 shows how the counter value, the oldest uncommitted value, and the tracking table are updated in the trace unit 110, in the situation where the processor core 100 speculatively executes groups of instructions A, B and C and subsequently indicates that group B should be cancelled and group A should be committed.

Group A starts with a load (LDR) instruction which is "interesting" and currently being traced. Hence, the entry of first index unit 230 corresponding to group A ("A.first") stores the current counter value of 0 and then the counter is incremented to 1. Finally the entry of last index unit 240 corresponding to group A ("A.last") stores the current counter value of 1. The next instruction in group A is the move instruction (MOV) which is neither "interesting" nor traced. The last instruction of group A is the branch-if-equal (BEQ) instruction which is both "interesting" and traced, so the counter is incremented to 2. The entry of last index unit 240 corresponding to group A ("A.last") is then updated with the current counter value of 2. It should be noted in fact that the final step for each instruction is always for the entry of last index unit 240 corresponding to the current group to be updated with the current counter value. Of course only if the counter has been updated for that instruction does this have any effect. The updating of the "last" value in this way is not explicitly described for the remaining instructions shown in Table 1.

Group B begins with the ADD instruction which is neither "interesting" nor traced, but as the first instruction in a new group causes the current counter value 2 to be stored in the corresponding entry of the first index value storage unit (i.e. B.first=2). The second instruction in group B is the SUB instruction which is similarly neither "interesting" nor traced and does not update any values.

Group C begins with the store (STR) instruction which is both "interesting" and traced, hence the current counter value is stored in the C.first entry of the first index storage unit and the counter is then incremented to 3. The second instruction in group C is the branch-if-not-equal (BNE) instruction which is also "interesting" and traced, so the counter is updated to 4.

Next, the processor core 100 indicates that the speculative execution of group B was incorrect and therefore groups B and C should be cancelled. In response, trace unit 110 (controlled by trace control unit 200) references the current count value of counter 210, which is currently 4, and the value stored in the corresponding entry of the first index storage unit 230 (i.e. B.first) which is 2. Trace unit 110 thus determines that two items of trace data should be cancelled (4-2) and generates an item of trace data indicative of this fact. The counter 210 is then reset to 2 (since it was previously 4 and 2 items have been cancelled).

Next, the processor core 100 indicates that instruction group A should be committed, since it has determined that the speculative execution of this group of instructions was correct. In response trace unit 110 (under control of trace control unit 200) references the value stored in the oldest uncommitted storage unit 250 (currently 0) and the entry in the last index storage unit 240 corresponding to this group (i.e. A.last) which is 2. The trace unit 110 thus determines that two items of trace data (2-0) should be committed, and generates an item of trace data indicative of this fact. The value stored in the oldest uncommitted storage unit 250 is then reset to the "last" value read for this group, i.e. 2 in this example.

In the embodiment described with reference to Table 1, it will be noted that the cancelling and committed is performed by reference to a number of events wherein the generated item of trace data indicates the number of events that should be cancelled or committed. In an alternative embodiment the trace unit can generate the cancelling/committing item of trace with reference to an event number. When this is the case, for a cancelling item of trace, the event number will be taken from the "first" value, i.e. the corresponding entry of the first index value storage unit, and for a committing item of trace the event number is taken from the "last" value, i.e. corresponding entry in the last index value storage unit. Note that although it might appear that committing and cancelling by event number would require less hardware (since the subtraction is not required), it should be noted that when indicating the cancelling/committing by a number of events this can often be compressed because it will generally have leading zeros. The choice of whether to commit/cancel by "number of event" or "event number" can be determined depending on the system requirements, i.e. whether less hardware in the trace unit or less bandwidth in the trace stream is deemed more important.

TABLE 1

Index storage unit values during speculative execution

| Group | Execute | Trace | Count value before | Oldest uncommitted count | Tracking table updates | Notes |
|---|---|---|---|---|---|---|
| A | LDR | LDR | 0 | 0 | A.first = 0<br>A.last = 1 | Count → 1 |
| A | MOV | | 1 | 0 | A.last = 1 | |
| A | BEQ | BEQ | 1 | 0 | A.last = 2 | Count → 2 |
| B | ADD | | 2 | 0 | B.first = 2<br>B.last = 2 | |
| B | SUB | | 2 | 0 | B.last = 2 | |
| C | STR | STR | 2 | 0 | C.first = 2<br>C.last = 3 | Count → 3 |
| C | BNE | BNE | 3 | 0 | C.last = 4 | Count → 4 |
| | Cancel Group B | Cancel 2 items | 4 | 0 | | Current count = 4,<br>B.first = 2, therefore<br>cancel 2 items (4 − 2);<br>Count → 2 |
| | Commit Group A | Commit 2 items | 2 | 0 | | Oldest uncommitted =<br>0, A.last = 2, therefore<br>commit 2 items (2 − 0);<br>Oldest uncommitted<br>→ 2 |

A further example is now discussed with reference to Table 2 below, in which the trace unit further filters the trace generated, in the example given by not tracing the store (STR) instruction. The values given in Table 2 for groups A and B are the same as those given in Table 1. However, for the first instruction of group C the STR instruction is not traced, so the count is not incremented. Hence, only when the BNE instruction in group C (which is traced) is encountered is the count incremented to 3.

Hence, when the processor core issues the "cancel B" message, the trace unit 110 determines that the current count is 3, B.first is 2 (as in the Table 1 example), and therefore only one item of trace (3-2) should be cancelled. Similarly the count is only reduced by one (to a value of 2). When the processor core issues the "commit A" message, as in Table 1, the oldest uncommitted count is 0, A.last=2 and therefore two items of trace are committed. The oldest uncommitted count is then updated to 2.

TABLE 2

Index storage unit values during speculative execution with filtered trace

| Group | Execute | Trace | Count value before | Oldest uncommitted count | Tracking table updates | Notes |
|---|---|---|---|---|---|---|
| A | LDR | LDR | 0 | 0 | A.first = 0<br>A.last = 1 | Count → 1 |
| A | MOV | | 1 | 0 | A.last = 1 | |
| A | BEQ | BEQ | 1 | 0 | A.last = 2 | Count → 2 |
| B | ADD | | 2 | 0 | B.first = 2<br>B.last = 2 | |
| B | SUB | | 2 | 0 | B.last = 2 | |
| C | STR | | 2 | 0 | C.first = 2<br>C.last = 2 | Not traced, so count not incremented |
| C | BNE | BNE | 2 | 0 | C.last = 3 | Count → 3 |
| | Cancel B | Cancel 1 | 3 | 0 | | Current count is 3, B.first = 2, therefore cancel 1 item (3 − 2); Count → 2 |
| | Commit A | Commit 2 | 3 | 0 | | Oldest uncommitted count is 0, A.last = 2, therefore commit 2 items (2 − 0); Oldest uncommitted count is now 2. |

Whilst each group of instructions discussed with reference to Tables 1 and 2 may remain as distinct group, which is speculatively executed as a group and then committed or cancelled as a group, in some embodiments two groups of instructions may be merged together after execution.

TABLE 3

Index storage unit values during speculative execution with merging

| Group | Execute | Trace | Count value before | Oldest uncommitted count | Tracking table updates | Notes |
|---|---|---|---|---|---|---|
| A | LDR | LDR | 0 | 0 | A.first = 0<br>A.last = 1 | Count → 1 |
| A | MOV | | 1 | 0 | A.last = 1 | |
| A | BEQ | BEQ | 1 | 0 | A.last = 2 | Count → 2 |
| B | ADD | | 2 | 0 | B.first = 2<br>B.last = 2 | |
| B | SUB | | 2 | 0 | B.last = 2 | |
| B | BNE | BNE | 2 | 0 | B.last = 3 | Count → 3 |
| C | STR | STR | 3 | 0 | C.first = 3<br>C.last = 4 | Count → 4 |
| C | SUB | | 4 | 0 | | |
| | BNE resolved, merge B into A | | 4 | 0 | A.last = 3 | B.last copied into A.last |
| B | MOV | | 4 | 0 | B.first = 4<br>B.last = 4 | Group B reused |
| B | BLT | BLT | 4 | 0 | B.last = 5 | Count → 5 |
| | Commit A (LDR resolved) | Commit 3 | 5 | 0 | | Oldest uncommitted count is 0, A.last = 3, therefore commit 3 items (3 − 0); Oldest uncommitted count is now 3. |
| | Cancel B (exception coming) | Cancel 1 | 5 | 3 | | Current count is 5, B.first = 4, therefore cancel 1 item (5 − 4); Count → 4 |

Table 3 shows how the values in the values in the index storage unit (the "tracking table") 220 are used in such a situation. In this example the BNE instruction in group B is resolved before the LDR instruction in group A. In this situation the processor core 100 indicates this fact, instructing the trace unit to merge group B into group A. This is done by copying the value of B.last into A.last. In other words, the set of trace values corresponding to the group A grows by one (since the trace item of the BNE instruction now forms part of the set of trace items that will necessarily follow successful execution of the LDR instruction which forms the start of group A). Once this merge has been performed, the group label B is then available for reuse and is taken as the label for the next group of instructions after group C. In this new group B (in which MOV and BLT are executed), only the BLT is traced.

Figure 4:
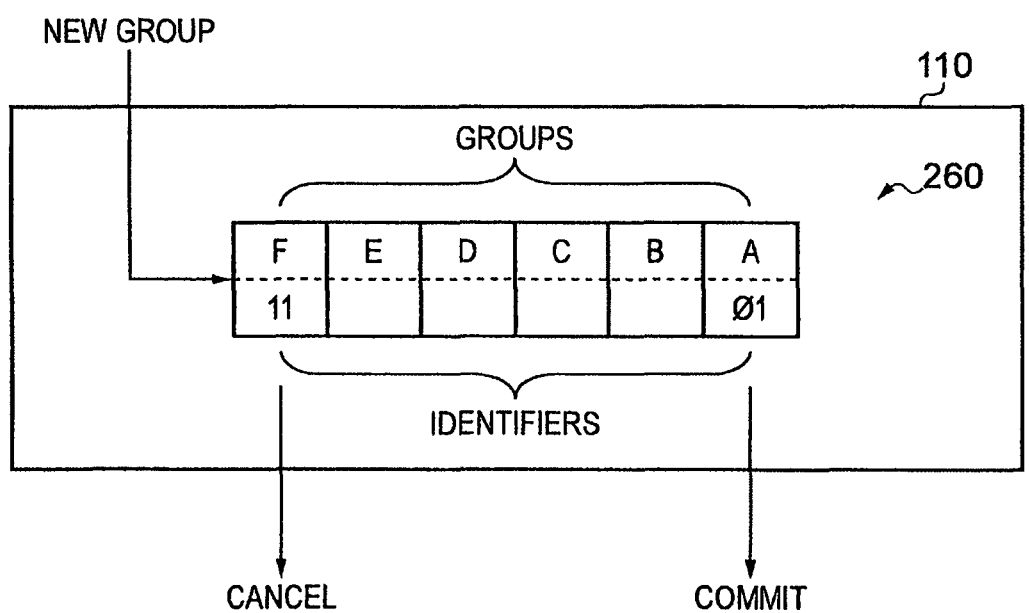
FIG. 4 schematically illustrates an alternative configuration of the trace unit of FIG. 1.

In a simpler embodiment, the index storage unit can be arranged as a FIFO unit. This is schematically illustrated in FIG. 4, in which trace unit 110 comprises a trace indexing unit in the form of FIFO 260. One advantage of this simplified arrangement is that it does not require the full index value to be stored in each entry of the index storage unit 260.

As groups are received by the trace unit 110, they are added to the end of the FIFO 260. Then, as groups are committed, they are removed from the front of the FIFO, whilst as groups are cancelled, they are taken from the end of the FIFO. Each entry in the FIFO contains a small identifier which indicates the number of interesting instructions in that group. In the illustrated example where a maximum of 2 interesting instructions can be in any group, the identifier is a 2-bit field indicating 0, 1 or 2. As each entry is taken from the FIFO (on either a Commit or Cancel), the number of trace events to commit or cancel is simply the number represented by the identifier in that entry in the FIFO. If multiple groups are committed or cancelled, then the identifiers are summed from the FIFO entries removed.

The variation on the configuration of trace unit 110 also shown in FIG. 2 (dashed boxes) is now described. At any given time there will be a number of items of speculative trace data which have not been committed or cancelled. This number is in the range zero to the maximum-speculation-depth of the processor. It should also be noted that it is not usually necessary to output commit trace data immediately. It is possible to delay commits, combine commits by adding the commit counts together, or to split up commits so long as the commit counts output never exceed those generated by the processor.

These factors can be used to create a system where commits are implied rather than explicitly output in the trace stream, which further improves trace efficiency. Instead of being output immediately a total is kept (in the "commits not yet output" storage unit 252) indicating the total number of commit counts not yet output. A second count is kept (in the "speculation depth" storage unit 254) of the current number of speculative trace data items. When a trace data item is output the speculation depth is incremented by one. When a commit count is output the speculation depth is decremented by the commit number. When a cancel count is output the speculation depth is decremented by the cancel number.

As more trace data items are output the speculation depth will reach the maximum speculation depth. When this occurs a commit with count=1 is implied. At the same time the speculation depth is decremented by one. The total commit count is also decremented by one.

If the trace unit is instructed to stop generating trace data then the trace unit may be configured either:

1) to output the current outstanding total commit count and any subsequent commit counts are output immediately; or
2) to wait until all trace data has been either committed or cancelled and then output the total commit count.

The techniques of the present invention also find particular applicability for an out-of-order processor, particularly in the context of data values and data addresses. Tracing data (as opposed to instructions) in an out-of-order processor must contend with the additional complexity that an out-of-order processor will generate or receive data values in a different order to the data addresses. The indexing of the items of trace data provided by the present invention allows data values to be matched with their data addresses. However, a further difficulty with tracing data values and addresses is that whilst a limit may be imposed on how late a data address can be with respect to its parent instruction, this is not practical for data values with respect to their parent data address. For instance, a read may take hundreds of cycles to complete, and in that time any number of instructions could have been executed (so long as none of these instructions required the read value).

Figure 5:
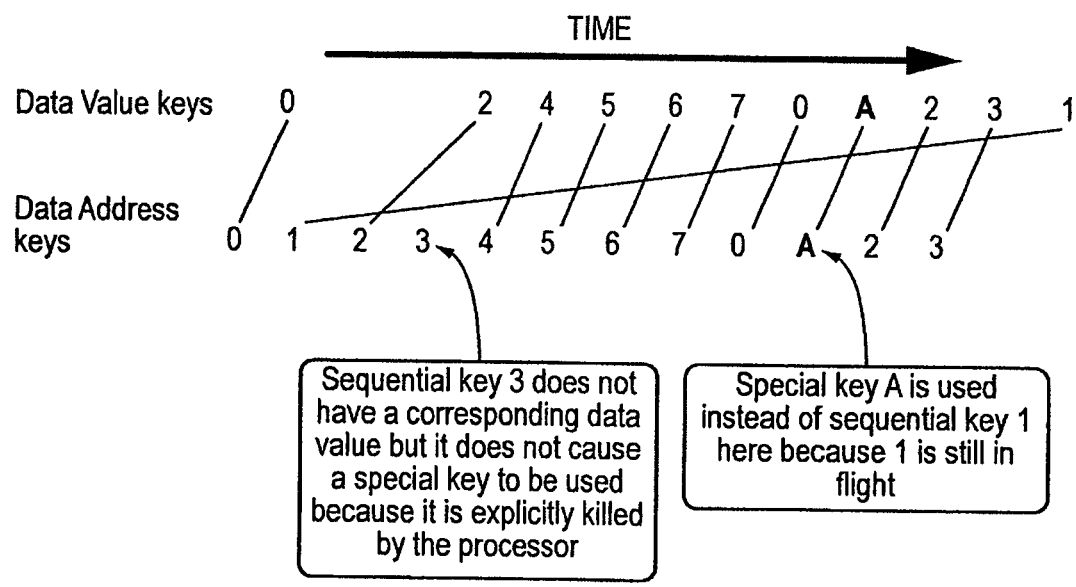
FIG. 5 illustrates the use of sequential keys and a special key according to one embodiment.

According to the techniques of the present invention, a trace indexing unit in the trace unit associates an index value with data addresses, such that these data addresses may be referred to. In FIG. 5, these index values are the "data address keys" in the lower line of numbers. It can be seen that these keys are generally sequential and further that the keys wrap-around to 0 after reaching a value of 7. Generally the associated data values are available shortly after the key, and hence when the sequence of data keys wraps around, the keys may be reused without conflict. However, if a data transfer takes a long time to complete then a trace key could be reused before it has been released. This is illustrated in FIG. 5 by data address key number 1 for which the corresponding data value is not received for an unusually long time. Hence, by the time that the data address key 1 should be used for the second time in FIG. 5 it is still "in-flight" and can therefore not be used. Instead, the trace unit is configured to use a special key (key A) instead of sequential key 1. In this embodiment, this special key A is in fact the core key which processor 100 uses to track this data address whilst it is waiting for the data value to be returned. In other embodiments the special key can be derived from a different "alphabet", so long as that alphabet has a one-to-one correspondence with the core keys. FIG. 5 also illustrates that some sequential keys may not have a corresponding data value if they are explicitly killed by the processor (e.g. the first instance of sequential key 3). It should be noted that there is no need to check if a special key is in-flight because it cannot be reused whilst in-flight due to the rules in the core about how the core keys are used (they must also be used uniquely).

Figure 6:
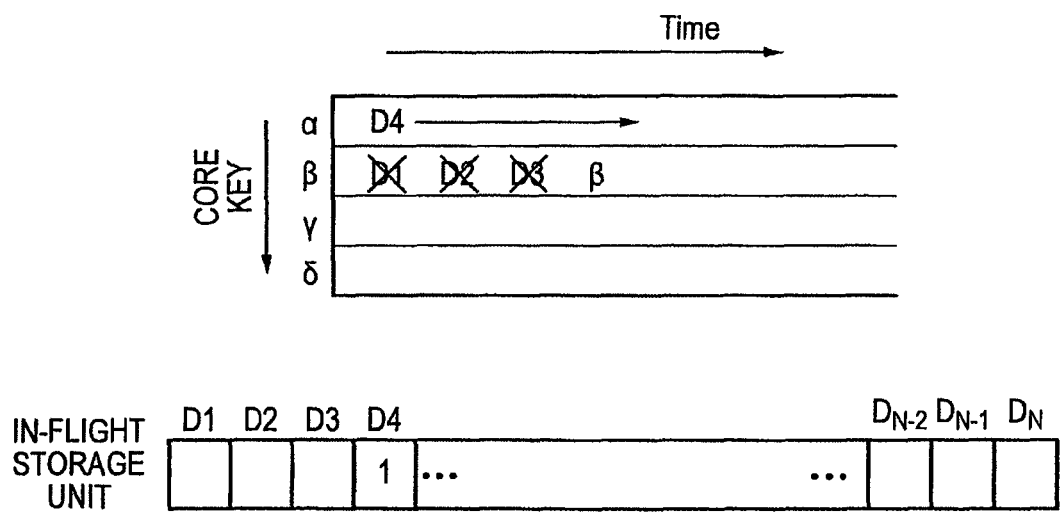
FIG. 6 schematically illustrates an index storage unit according to one embodiment.

FIG. 6 schematically illustrates one embodiment of the key tracking table wherein the data address keys are referenced by core key. Here, core key β is used by the processor core to index three data addresses which are attributed the sequential keys D1, D2 and D3. The next data address is used by core key β, the trace unit identifies that the next sequential key, namely D4, is still in use by core key α and hence uses the core key β itself as the index key for the current data address. The trace unit identifies that sequential key D4 is still in-flight by referring to the associated in-flight storage unit in which a flag set in association with sequential index key D4 indicates that it is still in-flight.

Figure 7:
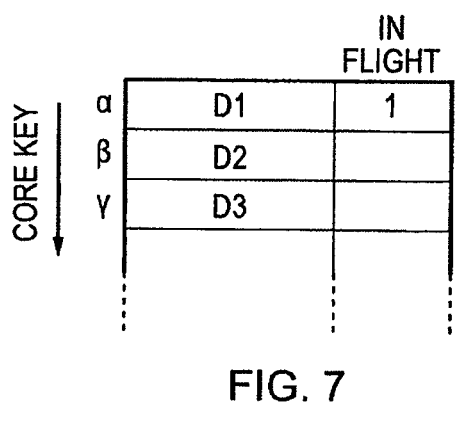

An alternative embodiment is illustrated in FIG. 7 in which the in-flight indicator is stored by core key. This arrangement requires that when a sequential key (D1, D2 etc.) is used a full associative lookup is performed in the key tracking table. If a match is found for that sequential key and the corresponding core key flag is set then it is determined that a sequential key is in-flight.

Figure 8:
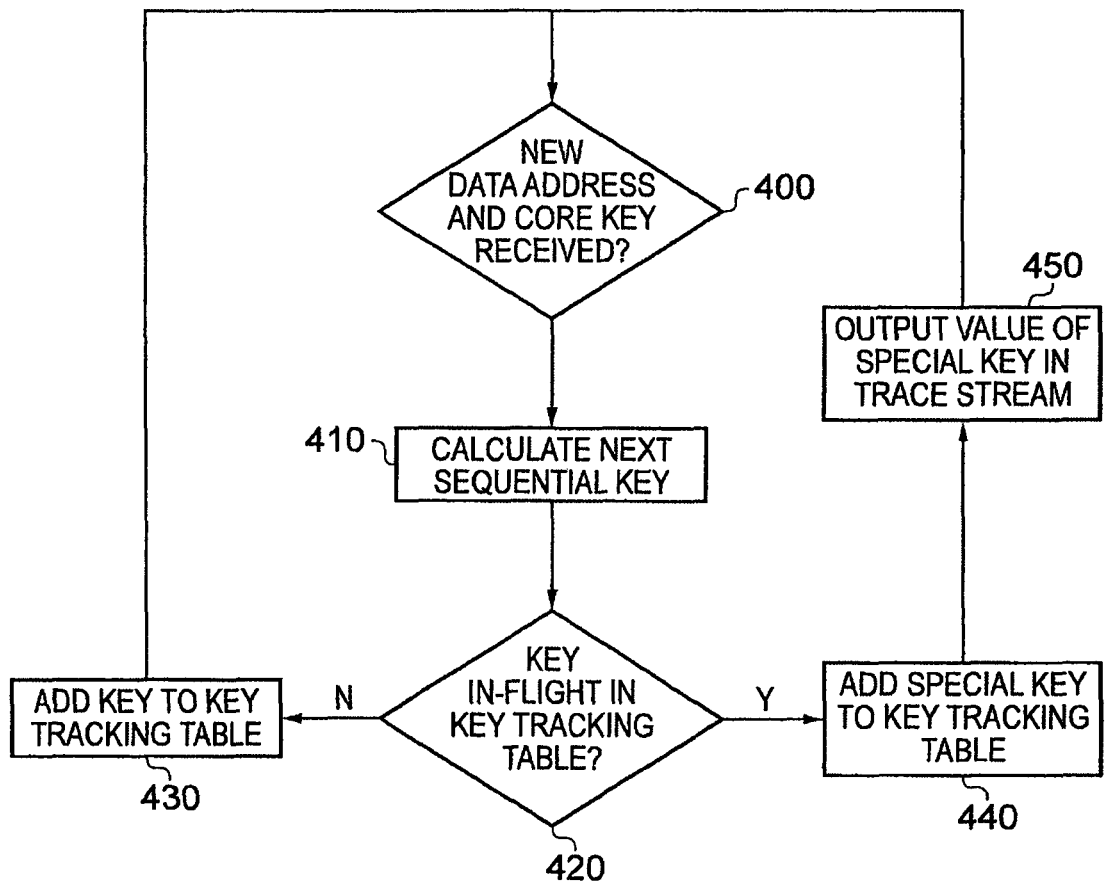
FIG. 8 schematically illustrates a sequence of steps taken by a trace unit according to one embodiment.

FIG. 8 schematically illustrates a series of steps taken by a tracing unit in one embodiment. The flow begins at step 400 where the trace unit receives a new data address and an associated core key from the processor core. Then at step 410 the trace unit calculates the next sequential key and at step 420 it is determined if that key is currently "in-flight" in the key tracking table. If it is not, then the flow proceeds to step 430 and that next sequential key is added to the key tracking table and the flow returns to step 400. If however at step 420 it is determined that the next sequential key is currently in-flight, then instead the special key is added to the key tracking table at step 440 and at step 450 the value of that special key is output in the trace stream. The flow then returns to step 400. It should be noted that if a special key has been used in place of the next sequential key, then it is generally preferable to not immediately retry that next sequential key on the next iteration of step 410, since if it has been found to be in use on one iteration, it is likely to still be in use on the next.

Generally it will be recognised that the more sequential keys that are available, the less likely it is that the special keys will be required. There can be any number of sequential keys, but the range of N to 3N is generally appropriate where there are N core keys. It should be noted that the sequential keys do not need to be output with the data address because its value can be predicted, being one of the predetermined sequence of index values generated by the trace unit.

Figure 9:
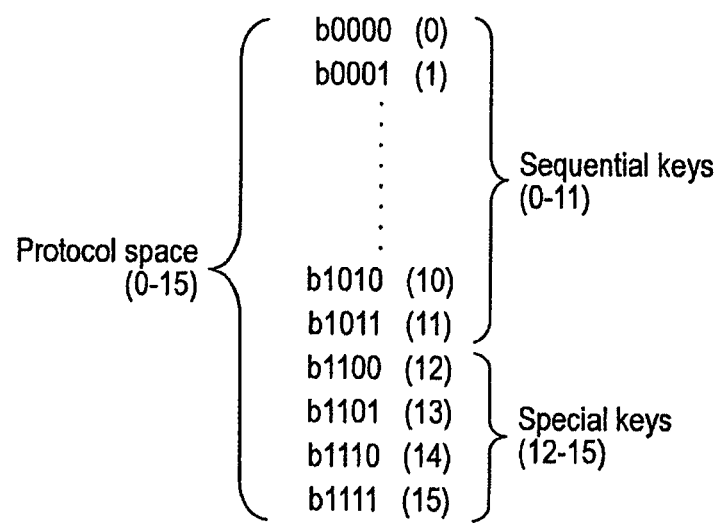
FIG. 9 illustrates a protocol space of 16 keys divided into 12 sequential keys and 4 special keys.

It should further be noted that the sequential keys and the special keys could use entirely separate protocol encoding, but in some embodiments the same protocol encoding could be used so long as there is no overlap. For example in a range of values 0-15, the sequential keys could take values 0-11 and the special keys could take the values 12-15. The recipient of the trace data would of course need to know which convention had been used. FIG. 9 illustrates a protocol space of 16 keys (0-15) divided into 12 sequential keys and 4 special keys.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A trace unit configured to generate items of trace data indicative of processing activities of a data processing unit, said trace unit comprising:
   a trace indexing unit configured to associate an index value with at least a subset of the items of trace data generated by the trace unit,
   said trace indexing unit configured to generate said index value as one of a predetermined sequence of index values,
   wherein an $n+1^{th}$ index value in said predetermined sequence can be determined from only an $n^{th}$ index value in said predetermined sequence, wherein said trace unit comprises an index storage unit configured to store a difference between two index values.

2. The trace unit as claimed in claim 1, wherein said trace unit comprises a counter, said counter configured to provide said predetermined sequence of index values.

3. The trace unit as claimed in claim 1, wherein said trace unit comprises an index storage unit configured to store at least one said index value.

4. The trace unit as claimed in claim 1, wherein said index storage unit is a FIFO device.

5. The trace unit as claimed in claim 1, wherein said trace unit is configured, in response to a predetermined event, to reset said index value of said predetermined sequence of values to a predetermined value.

6. The trace unit as claimed in claim 1, wherein said trace unit is configured to generate said predetermined sequence of values as a looping sequence of values.

7. The trace unit as claimed in claim 1, wherein said trace unit is configured not to generate an item of trace data for at least one type of instruction to which said data processing unit is responsive.

8. The trace unit as claimed in claim 1, wherein said processing activities of said data processing unit comprise reference to a stored data value using a data address and said index value is a data address index value associated with said at least one data address.

9. The trace unit as claimed in claim 8, wherein said reference to said stored data value comprises loading said stored data value.

10. The trace unit as claimed in claim 8, wherein said reference to said stored data value comprises storing said stored data value.

11. The trace unit as claimed in claim 8, wherein said trace unit is configured to store said data address index value in a data address index value storage table.

12. A trace unit configured to generate items of trace data indicative of processing activities of a data processing unit, said trace unit comprising:
    a trace indexing unit configured to associate an index value with at least a subset of the items of trace data generated by the trace unit,
    said trace indexing unit configured to generate said index value as one of a predetermined sequence of index values,
    wherein an $n+1^{th}$ index value in said predetermined sequence can be determined from only an $n^{th}$ index value in said predetermined sequence, wherein said trace unit comprises an index storage unit configured to store at least one said index value, wherein said processing activities of said data processing unit comprise speculative instruction execution and said at least one index value is associated with at least one speculatively executed instruction.

13. The trace unit as claimed in claim 12, wherein said index storage unit is configured to store said at least one index value until said at least one speculatively executed instruction has been either committed or cancelled.

14. The trace unit as claimed in claim 12, wherein said speculatively executed instruction forms part of a group of instructions, wherein speculative execution of a first instruction of said group of instructions necessitates speculative execution of all instructions of said group of instructions.

15. The trace unit as claimed in claim 14, wherein said index storage unit comprises a first index storage unit configured to store a first index value associated with a first instruction in said group of instructions.

16. The trace unit as claimed in claim 15, wherein said first index storage unit comprises a first plurality of entries and is configured to store said first index value in dependence on an indicator indicative of said group of instructions.

17. The trace unit as claimed in claim 16, wherein a number of said first plurality of entries corresponds to at least a maximum number of groups of instructions which may be speculatively executed by said data processing unit.

18. The trace unit as claimed in claim 15, wherein said trace unit is configured to receive a cancelling indication from said data processing unit, said cancelling indication indicative that a selected group of instructions which has been speculatively executed has been cancelled, and said trace unit is configured to generate a cancelling item of trace data indicative of said selected group of instructions.

19. The trace unit as claimed in claim 18, wherein said trace unit is configured, on receipt of said cancelling indication, to generate said cancelling item of trace data in dependence on a first index value stored in said first index storage unit and associated with said selected group of instructions.

20. The trace unit as claimed in claim 19, wherein said trace unit comprises a counter configured to provide said predetermined sequence of index values and said trace unit is configured to generate said cancelling item of trace data in further dependence on a current counter value of said counter.

21. The trace unit as claimed in claim 14, wherein said index storage unit comprises a last index storage unit configured to store a last index value associated with a last instruction in said group of instructions.

22. The trace unit as claimed in claim 21, wherein said last index storage unit comprises a second plurality of entries and is configured to store said last index value in dependence on an indicator indicative of said group of instructions.

23. The trace unit as claimed in claim 22, wherein a number of said second plurality of entries corresponds to at least a maximum number of groups of instructions which may be speculatively executed by said data processing unit.

24. The trace unit as claimed in claim 21, wherein said trace unit is configured to receive a committing indication from said data processing unit, said committing indication indicative that a selected group of instructions which has been speculatively executed has been committed, and said trace unit is configured to generate a committing item of trace data indicative of said selected group of instructions.

25. The trace unit as claimed in claim 24, wherein said trace unit is configured, on receipt of said committing indication, to generate said committing item of trace data in dependence on a last index value stored in said last index storage unit and associated with said selected group of instructions.

26. The trace unit as claimed in claim 25, wherein said trace unit comprises a counter configured to provide said predetermined sequence of index values and an uncommitted storage unit, said trace unit configured, when generating said committing item of trace, to store a current counter value of said counter in said uncommitted storage unit.

27. The trace unit as claimed in claim 26, wherein said trace unit is configured to generate said committing item of trace in dependence on a value stored in said uncommitted storage unit.

28. The trace unit as claimed in claim 24, wherein said trace unit comprises a speculation depth counter, said speculation depth counter configured to indicate a current speculation depth of instructions being executed by said data processing unit.

29. The trace unit as claimed in claim 28, wherein said trace unit comprises a pending commit counter, said pending commit counter configured to indicate a current number of committing items of trace data which are pending output.

30. The trace unit as claimed in claim 29, wherein said trace unit is configured to increment said pending commit counter when said committing indication is received without said committing item of trace data being generated.

31. The trace unit as claimed in claim 29, wherein said trace unit is configured to decrement said pending commit counter when said speculation depth counter reaches a predetermined value.

32. The trace unit as claimed in claim 28, wherein when said speculation depth counter reaches a predetermined value generation of a further item of trace data implies that said trace unit has received a further committing indication from said data processing unit.

33. The trace unit as claimed in claim 14, wherein said index storage unit comprises a first index storage unit configured to store a first index value associated with a first instruction in said group of instructions, wherein said index storage unit comprises a last index storage unit configured to store a last index value associated with a last instruction in said group of instructions, wherein said last index value is stored in a format relative to said first index value.

34. The trace unit as claimed in claim 33, wherein said format relative to said first index value is a 2-bit data format.

35. The trace unit as claimed in claim 14, wherein said trace unit is configured to receive a merging indication from said data processing unit related to an initial group of instructions and a subsequent group of instructions, wherein said data processing unit issues said merging indication if it is determined that said subsequent group of instructions will execute if said initial group of instructions is executed, and hence that said initial group of instructions and said subsequent group of instructions are a merged group of instructions, and wherein said trace unit is configured, in dependence on said merging indication, to amend at least one merged index value in said index storage unit associated with said merged group of instructions.

36. The trace unit as claimed in claim 35, wherein said trace unit is configured to generate a merge item of trace data, said merge item of trace date indicative that said initial group of instructions and said subsequent group of instructions have been merged.

37. A trace unit configured to generate items of trace data indicative of processing activities of a data processing unit, said trace unit comprising:
 a trace indexing unit configured to associate an index value with at least a subset of the items of trace data generated by the trace unit,
 said trace indexing unit configured to generate said index value as one of a predetermined sequence of index values,
 wherein an $n+1^{th}$ index value in said predetermined sequence can be determined from only an $n^{th}$ index value in said predetermined sequence, wherein said trace unit comprises an index storage unit configured to store at least one said index value, wherein said index storage unit is configured selectively to store an in-flight indicator, said in-flight indicator indicating that a stored index value of said predetermined sequence of index values is currently in use.

38. The trace unit as claimed in claim 37, wherein said trace unit is configured, when generating a next index value, to reference said in-flight indicator and, if said in-flight indicator indicates that said next index value is still in use, to store a substitute index value in place of said next index value.

39. A trace unit configured to generate items of trace data indicative of processing activities of a data processing unit, said trace unit comprising:
- a trace indexing unit configured to associate an index value with at least a subset of the items of trace data generated by the trace unit,
- said trace indexing unit configured to generate said index value as one of a predetermined sequence of index values,
- wherein an $n+1^{th}$ index value in said predetermined sequence can be determined from only an $n^{th}$ index value in said predetermined sequence, wherein said processing activities of said data processing unit comprise reference to a stored data value using a data address and said index value is a data address index value associated with said at least one data address, wherein said trace unit is configured to store said data address index value in a data address index value storage table, wherein said trace unit is configured selectively to store an in-flight indicator, said in-flight indicator indicating that reference to said stored data value associated with said data address index value has not yet completed and said data address index value is in-flight.

40. The trace unit as claimed in claim 39, wherein said trace unit is configured, when generating a next data address index value, to reference a stored in-flight indicator and, if said stored in-flight indicator indicates that said next data address index value is still in-flight, to store a substitute data address index value in place of said next data address index value.

41. The trace unit as claimed in claim 40, wherein said substitute data address index value comprises a data processing unit index value, wherein said data processing unit index value is used by said data processing unit to reference said data address.

42. The trace unit as claimed in claim 40, wherein said substitute data address index value has a one-to-one correspondence with a data processing unit index value, wherein said data processing unit index value is used by said data processing unit to reference said data address.

43. The trace unit as claimed in claim 41, wherein said in-flight indicator is stored in association with said data address index value.

44. The trace unit as claimed in claim 41, wherein said in-flight indicator is stored in association with said data processing unit index value.

45. The trace unit as claimed in claim 40, wherein said trace unit is configured to generate an item of trace data indicative of said substitute data address index value.

46. The trace unit as claimed in claim 40, wherein said substitute data address index value and said data address index value share an encoding protocol.

47. A trace unit configured to generate items of trace data indicative of processing activities of a data processing unit, said trace unit comprising:
- a trace indexing means for associating an index value with at least a subset of the items of trace data generated by the trace unit,
- said trace indexing means configured to generate said index value as one of a predetermined sequence of index values,
- wherein an $n+1^{th}$ index value in said predetermined sequence can be determined from only an $n^{th}$ index value in said predetermined sequence, and
- index storage means for storing a difference between two index values.

48. A method of generating items of trace data indicative of processing activities of a data processing unit, said method comprising the steps of:
- generating said items of trace data;
- associating an index value with at least a subset of the generated items of trace data;
- generating said index value as one of a predetermined sequence of index values,
- wherein an $n+1^{th}$ index value in said predetermined sequence can be determined from only an $n^{th}$ index value in said predetermined sequence, and
- storing a difference between two index values.

* * * * *